(12) United States Patent
Harris

(10) Patent No.: US 8,363,521 B2
(45) Date of Patent: Jan. 29, 2013

(54) ADAPTIVE HIGH FIDELITY REPRODUCTION SYSTEM

(76) Inventor: Scott C. Harris, Rancho Santa Fe, CA (US)

( * ) Notice: Subject to any disclaimer, the term of this patent is extended or adjusted under 35 U.S.C. 154(b) by 899 days.

(21) Appl. No.: 12/482,446

(22) Filed: Jun. 10, 2009

(65) Prior Publication Data

US 2009/0252001 A1 Oct. 8, 2009

Related U.S. Application Data

(60) Division of application No. 11/609,936, filed on Dec. 13, 2006, now Pat. No. 7,996,847, which is a continuation of application No. 10/848,993, filed on May 18, 2004, now Pat. No. 7,154,819, which is a division of application No. 09/799,460, filed on Mar. 5, 2001, now Pat. No. 6,738,318.

(51) Int. Cl.
*G11B 15/52* (2006.01)
(52) U.S. Cl. .................. 369/47.15; 369/124.06
(58) Field of Classification Search .......... None
See application file for complete search history.

(56) References Cited

U.S. PATENT DOCUMENTS

| | | | |
|---|---|---|---|
| 4,018,448 A | 4/1977 | Di Matteo | |
| 4,823,391 A | 4/1989 | Schwartz | |
| 4,852,178 A | 7/1989 | Inkman et al. | |
| 5,396,562 A | 3/1995 | Ishimitsu et al. | |
| 5,430,802 A | 7/1995 | Page | |
| 5,801,694 A * | 9/1998 | Gershen | 715/727 |
| 5,910,990 A | 6/1999 | Jang | |
| 6,195,435 B1 | 2/2001 | Kitamura | |
| 6,608,907 B1 | 8/2003 | Lee | |
| 6,665,407 B1 | 12/2003 | Dicker et al. | |
| 6,686,531 B1 * | 2/2004 | Pennock et al. | 84/615 |

* cited by examiner

*Primary Examiner* — Paul Huber
(74) *Attorney, Agent, or Firm* — Law Office of Scott C. Harris, Inc.

(57) ABSTRACT

Audio is adaptively associated with speakers, depending on the speaker configuration that is present. Each speaker it receives an audio assignment based on its individual spectral characteristics. As more speakers are added, content is adaptively associated with that you speaker, and taken away from the previous.

17 Claims, 2 Drawing Sheets

ADAPTIVE HIGH FIDELITY REPRODUCTION SYSTEM

This application is a divisional of U.S. application Ser. No. 11/609,936, filed Dec. 13, 2006, now U.S. Pat. No. 7,996,847, which is a continuation of U.S. application Ser. No. 10/848,993, filed May 18, 2004, now U.S. Pat. No. 7,154,819, which is a divisional of U.S. application Ser. No. 09/799,460, filed Mar. 5, 2001, now U.S. Pat. No. 6,738,318.

BACKGROUND

High fidelity systems attempt to simulate the sound that comes from actual sound-producing objects. Real music is produced when each of a plurality of different instruments, at a different location, produces its own unique sound. Each instrument also has unique sonic tuning characteristics. The real music is produced from these instruments, at different locations, producing sounds. Producing a simulation of this real music is the objective of a high fidelity music reproduction system.

Movies, in contrast, actually have a different objective for their sound production. In the 1980s, movie sound became a format with multiple channels providing the sound output. This format, called surround sound, produced five or more channels of sound. The channels included left and right main channels for stereo music. A center channel was used for mono parts of the reproduction such as the voice. In addition, left and right surround channels were provided for special effects. In addition, additional channels may be provided for sound having special characteristics such as sub woofers. This sound system attempts to produce the feeling of actually being part of the action depicted by the movie.

SUMMARY

The present inventor believes that an ideal musical reproduction, like real music, should produce the sound from a plurality of instruments, each coming from its own tuned source that has tuning/music reproduction characteristics that is most closely representative of the instrument. The current system of stereo reproduction reproduces most, if not all, instruments, from two different sources (speakers), both of which are tuned the same.

According to the present system, information is produced for reproduction by music reproduction hardware. The information as produced has a number of separated parts. That is, each stream of audio information, such as a song, may have separated parts that form that stream. In one embodiment, those parts may be tracks on the audio reproduction medium.

The separated parts are adaptively associated with different music reproduction hardware based on the actual characteristics of the hardware producing the music. That is, for example, the violin sounds may be produced by the speaker most closely tuned to violins. Another speaker, e.g., most closely tuned to horns, may reproduce the horns.

Another aspect automatically determines specific characteristics of the hardware, and forms a file indicative of those specific characteristics of the hardware. The contents of that file is used to adaptively associate the content of the media, e.g., the music, with the hardware.

BRIEF DESCRIPTION OF THE DRAWINGS

These and other aspects of the invention will be described in detail with reference to the accompanying drawings, wherein.

DETAILED DESCRIPTION

Figure 1:
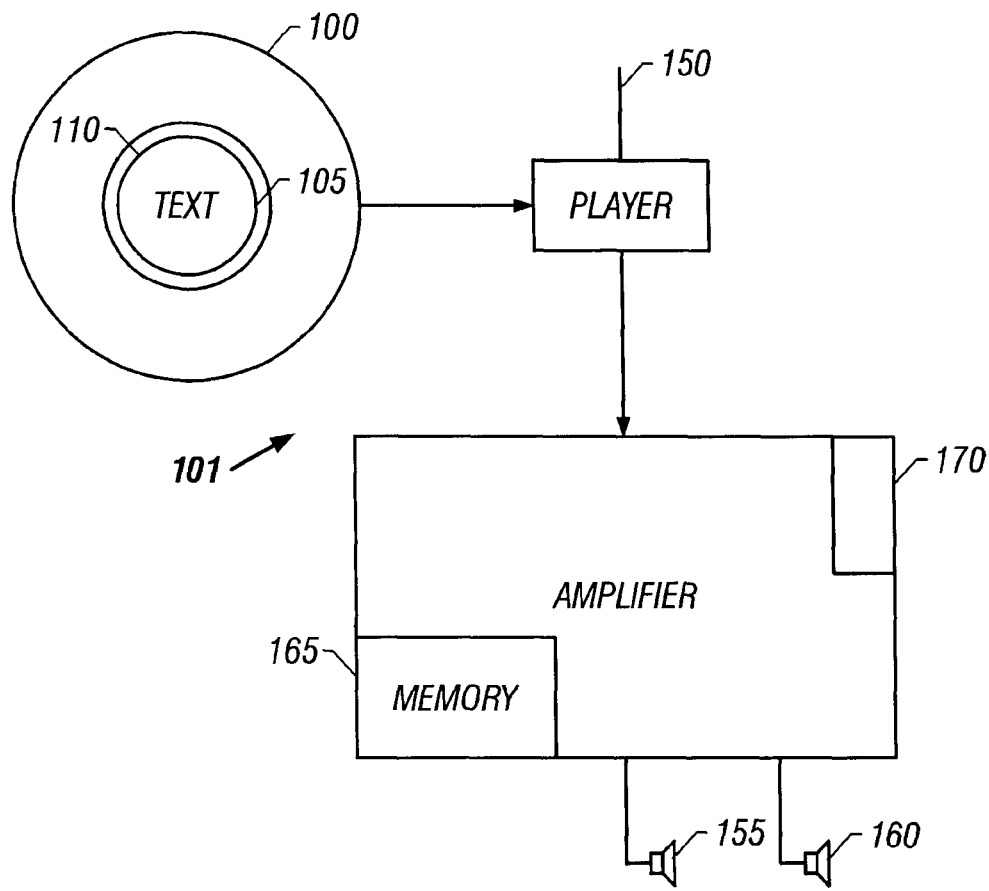
FIG. 1 shows a block diagram of the system.

Modern audio reproduction media may have more space for storing the data that is indicative of the audio. For example, the so-called DVD may have 100 times the storage capability of a standard CD, also known as a "Redbook" format CD. Various enhanced CD formats have also been suggested which provide more data on the media and that can be used to store more information. In addition, modern compression formats, such as the MP3 format, allows reducing the size that is occupied by information placed on the media. Again, this has the effect of allowing the media to store more information.

Broadband channels are also available. For example, satellite radio channels are proposed. Broadband Internet channels have been used. In addition, audio content may also be produced over a cable and the like.

The present system will be described with reference to information being stored on the audio medium. A plurality of tracks are provided on the medium. The tracks each include information about a different aspect of the audio stream that is recorded on the medium. The audio medium is shown here as being a disk, but it could be understood that any different kind of audio containing medium could be used with the system of the present invention.

Each track may represent a specified kind of information. In one aspect, each track includes information about the same kind of instruments. The instruments included on a single track may be of the same time, e.g. all violins, or may have the same spectral characteristics, that is all string instruments, or all producing output within a specified spectral region, or primarily within a specified spectral region. Sounds may be grouped based on spectral characteristics, e.g., by using a fast Fourier transform on recorded sound from the instrument. Each instrument may be characterized on the spectrum, e.g. by forming a histogram indicating that amount of energy in each spectral bucket. Alternatively, instruments or sounds which may effectively compress may be grouped together. The instruments which are sufficiently similar may be grouped together as a track. This has a number of advantages in the context of the present system. First of all, it makes the information on the track more compressible by certain compression systems such as MP3, since each instrument on the track has similar characteristics. In addition, on readout, the track can be accurately reproduced by the same kind of reproduction equipment.

Multiple tracks are placed on the medium for different purposes. For example, a single medium may include movie style tracks such as left, right, center, left surround and right surround, and also a subwoofer setting. The left and right tracks on the medium represent the stereo information. The remaining information in the tracks may represent information from different individual instruments or instrument types. This information may include separate tracks for each of voices, strings, winds, guitar, percussion, bass strings, and bass winds, with the understanding that a each different instrument may also be broken up based on its characteristics e.g. bass or treble. The above has described 13 tracks for each stored item of information. It should be understood, however, that there may be fewer or more tracks, e.g. up to 20 tracks. Since each track may represent information of the specified instrument type, the information in the track may be highly compressible.

As can be seen from the above, the medium will typically include more information that is necessary to actually playback the audio on any system. For example, the medium may include stereo left and stereo right channels. However, on some systems, 10 speakers may be provided for different instrument types, and this information includes parts of the information that is also within the left and right stereo. If the separated channels are used, the audio left and audio right information might not be used. Therefore, the audio medium may include redundant information. Adaptive decisions are made during playback indicating which speakers and or which music reproduction equipment gets which content.

An embodiment is shown in FIG. 1. A disk 100 includes a plurality of tracks of information. For example, if the tracks above are used, the stream, shown as 110, may include 13 different channels. The medium may also include control track 105 which may be a data track including information about which tracks on the medium include which information.

The medium is read out by a player. The contents of the medium is interpreted by the adaptive element that is either in the player, or in a controller or amplifier associated with the player. The adaptive element is shown herein as 150, and as being part of the amplifier.

The amplifier is connected to a plurality of different speakers or different amplified speakers. Each speaker system, such as 155, has specified spectral and/or other sound producing characteristics. In an embodiment, each speaker may also be active, in the sense that it includes an electronic module associated with the speaker. That electronic module allows communication with the speaker, and may include information about the speaker's characteristics. In another embodiment, characteristics of the speakers may be obtained in a different way.

The characteristics of the speaker may be communicated to the memory 165 over the speaker wire using serial formats such as universal serial bus, or RS 232 for example. Alternatively, the amplifier 150 may include a medium reading capability shown as 170. This reading capability may read a storage medium, such as a floppy disk, memory stick, CD, or mini CD which is inserted therein. The medium includes information about the speakers, which is then read from the medium, and stored in the memory. Another way of communicating information is to obtain characteristics from a public network such as the Internet.

In another aspect, each speaker that is purchased is provided with an audio medium such as a CD or DVD. That audio medium is intended to be played in the CD player associated with the stereo. The contents of the CD are played as normal CD audio. However, electronic information about the speakers is encoded in the CD audio. Thus, this includes a specified code that can be read by the amplifier 150, and indicates that speaker information follows. The following information includes speaker information.

The main amplifier 150 includes also a processor 170 which makes adaptive decisions about which speakers will be selected to play each track or channel on the medium. This adaptive decision will be based on the specific characteristics of the speakers, and the specific characteristics of the audio. The decision is based on, of course, the specific hardware which is present in the system. More hardware, actually more speakers, in the system, will enable better sound. When fewer speakers are present, tracks will need to be combined. In the minimum configuration, only two speakers are present, and the standard stereo is played. Each time a speaker is added, it receives multiple tracks assigned to be played to it, based on its spectral characteristics. This enables the user to make purchases based on their preferences. The user who likes the sound of strings, for example, may purchase a speaker that is tuned to strings. When this speaker is added to the amplifier system 150, its characteristics are stored in memory 165. Playing of media will thereafter assign information from the media 100 to those speakers, based on the speakers characteristics. Conversely, other speakers for horns, and other instruments may also be purchased. Each speaker is adaptively associated with the content for those speakers. Each extra speaker is assigned with sound, and that sound is hence not played by the other speakers. Therefore, more speakers allow better reproduction of the sound.

Figure 2:
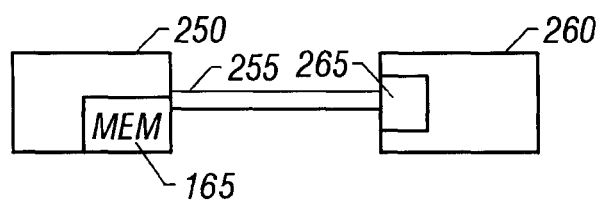
FIG. 2 shows a wired connection between amplifier and speaker.

Different ways of getting the information into the memory are also considered. FIG. 2 illustrates up plug and play type operation of doing this. In FIG. 2, the amplifier 250 is connected via a standard line connection to the speaker 260. The speaker 260 includes an electronics module therein 265. The module 265 communicates with a corresponding module in the amplifier, using any serial protocol but preferably Ethernet, USB, or RS 232. Any protocol that may communicate over a 2 wire line may be used. In this embodiment, the amplifier may poll the speaker using a low voltage level signal. Since the signal is at a low voltage level, it will produce little if any sound out of the speaker. However, the electronics module 265 within the speaker may still recognize this as control signals. The speaker responds with information indicative of its individual spectral characteristics. This information is then stored in the memory 165 within the amplifier. The information may also be used in the playback mode, to determine channel allocations for the information from the media.

Figure 3:
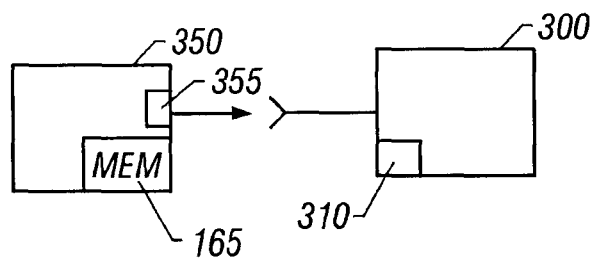
FIG. 3 shows a wireless connection.

A wireless alternative is shown in FIG. 3. This may use wireless formats such as bluetooth, wireless LAN, or some other wireless format. FIG. 3 shows a bluetooth module 310 in the speaker 300. The amplifier 350 also includes a bluetooth module shown as 355. Again, this system may operate by polling. The speaker may respond to a poll with information indicative of the speaker's individual characteristics. This information is then stored in the memory 165.

In any of these embodiments, the user can purchase more speakers at any time. Settings for the music are automatically determined by the characteristics of the speaker.

Figure 4:
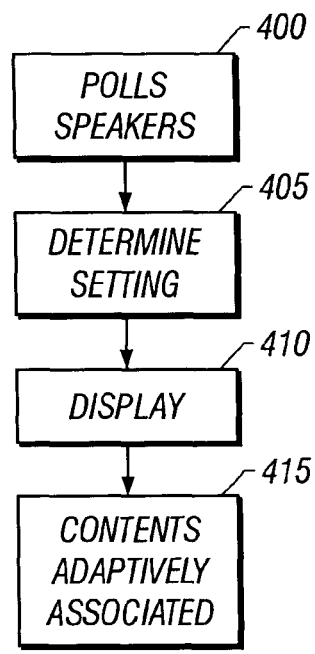
FIG. 4 shows a flowchart of operation.

The above-described operations may operate according to the flowchart of FIG. 4, which may run in the processor 170. At 400, the system polls all speakers. This may be carried out at each time of power on, or may be carried out only once for example on initial connection. The speakers may also include the capability of determining room acoustics, in which case it may be desirable to poll the speakers at each power up, or at time intervals.

At 405, the system determines settings based on the polling. These settings may optionally be displayed at 410. At 415, the content of the tracks is adaptively associated with the user's individual stereo setup.

The above has described the information stored on the medium. This "enhanced" information may be stored on the media in a number of different ways.

Figure 5A:
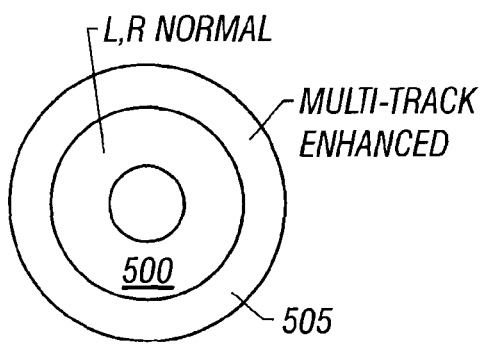
FIGS. 5A-5D show different ways of storing information for use in the present application.

FIG. 5A shows the medium being a disk with a first portion that has normal CD stereo 500, that can be read by any CD player, and reproduced through normal stereo equipment. A second, enhanced portion of the disk 505 includes multitrack enhanced information. Since the first portion is then typical CD form, this setup will require that the medium have additional space available. An advantage of this system is that the medium can be read on any standard CD player.

Figure 5B:

FIG. 5B shows another system in which the entire medium is stored in multitrack format. In this system, the standard stereo information is interleaved with other tracks of additional information. Standard CD format includes headers that are specified by the standard. These headers include information such as P and Q parts. These headers include signals that instruct a standard CD player to ignore certain parts of the data stream that is stored on the disk; those parts being reproduced only by enhanced players. For example, CDs may include capability of quad reproduction, and the enhanced information tracks could be labeled as quad, so that a standard player ignores this information.

Figure 5C:
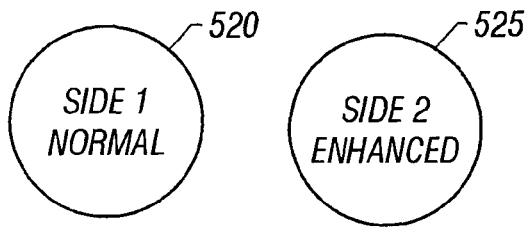
Figure 5D:
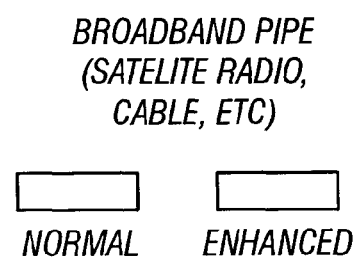

FIG. 5C shows another alternative in which a dual cited disk has a first side 520 representing normal information and a second side 525 which is an enhanced disk.

While the above has described the information being present on the disk, it should be understood that other forms of reproduction and obtaining of information are possible. All such forms are intended to be encompassed.

Other embodiments are within the disclosed invention.

The invention claimed is:

1. A storage media, comprising:
a storage portion, storing at least first and second information, respectively representing first and second streams of information, where said first stream of information represents different audio information than said second stream of information, but where said first stream of information and said second stream of information represent at least parts of audio that are to be reproduced simultaneously during a same period of time, where said first stream of information has first stored information indicative of a first group of sounds with only first spectral characteristics, and said second stream of information has second stored information indicative of a second group of sounds with only second spectral characteristics, wherein said first spectral characteristics have a spectrum that is different than a spectrum of said second spectral characteristics, and wherein said first stream of information and said second stream of information are separately readable and include information that indicates that said first stream of information is to be reproduced at the same time as said second stream of information, and wherein prior to said storing, said first information is compressed using a first compression that relies on similarities between said sounds in said first information, and said second information is compressed using a second a second compression that relies on similarities between sounds in said second information.

2. A media as in claim 1, wherein said first spectral characteristics includes information which has specified energies only within a first spectral range, and wherein said second stream of information includes information which has specified energies only within a second spectral range, and where said first spectral range is different than said second spectral range.

3. A media as in claim 1, wherein said first information includes information only from a first type of musical sources and said second information includes information only from a second type of musical sources different than the first type of musical sources.

4. A media as in claim 3, wherein said first information is information only from stringed sources, and said second information is information only from wind sources.

5. A media as in claim 3, wherein said first information is information only from musical instruments, and said second information is information only from voices.

6. A media as in claim 3, wherein said first information is information from sounds within music only having a specified spectral range which is predominantly not bass sources, and said second set of information is information only from sounds within music having a specified spectral range which is predominantly bass sources.

7. A method comprising:
obtaining a plurality of different sound items that collectively represent different parts of a musical composition that must be played simultaneously to represent said musical composition;
characterizing spectral characteristics of said multiple sounds;
grouping a first set of said multiple sounds into a first group which has first similar characteristic parts, where the sounds in the first set represent multiple different sounds with said similar characteristic parts;
grouping a second set of said multiple sounds into a second group which has second similar characteristics where the sounds in the second set represent multiple different sounds with said similar characteristic part; and
storing said first set on a storage media and storing said second set on said storage media separately, and in a way such that said first group and said second group can be separately reproduced from said storage media, and
further comprising, prior to said storing, compressing said first group using a first compression that relies on similarities between said sounds in said first group; and
second compressing said second group relying on a second compression that relies on similarities between sounds in said second group.

8. A method as in claim 7, wherein said first group includes information only from a first type of musical source and said second group includes information only from a second type of musical source different than the first type of musical source.

9. A method as in claim 8, wherein said first type of musical source includes only stringed sources, and said second type of musical source includes only wind sources.

10. A method as in claim 8, wherein said first type of musical source is information only from musical instruments, and said second type of musical source is information only from voices.

11. A method, comprising:
obtaining a plurality of different sound items that collectively represent different parts of a musical composition that must be played simultaneously to represent said musical composition;
characterizing spectral characteristics of said multiple sounds;
grouping a first set of said multiple sounds into a first group which has first similar characteristic parts, where the sounds in the first set represent multiple different sounds with said similar characteristic parts;
grouping a second set of said multiple sounds into a second group which has second similar characteristics where the sounds in the second set represent multiple different sounds with said similar characteristic part; and
storing said first set on a storage media and storing said second set on said storage media separately, and in a way such that said first group and said second group can be separately reproduced from said storage media,
wherein said characterizing comprises characterizing sounds based on amounts of energy within specified spectral ranges in said sound, and wherein said characterizing comprises carrying out a Fourier transform on said sounds.

12. A method, comprising:
obtaining a plurality of different sound items that collectively represent different parts of a musical composition that must be played simultaneously to represent said musical composition;
characterizing spectral characteristics of said multiple sounds;
grouping a first set of said multiple sounds into a first group which has first similar characteristic parts, where the sounds in the first set represent multiple different sounds with said similar characteristic parts;
grouping a second set of said multiple sounds into a second group which has second similar characteristics where the sounds in the second set represent multiple different sounds with said similar characteristic part; and
storing said first set on a storage media and storing said second set on said storage media separately, and in a way such that said first group and said second group can be separately reproduced from said storage media wherein said grouping comprises examining characteristics of said multiple sounds, and grouping said multiple sounds in a way that allows each group's sounds to be more efficiently compressed.

13. A player, comprising
a playing device, reading at least first information and second information from a media storage device, said first information representing a first stream of information, and said second information representing a second stream of information, where said first stream of information is separate information from said second stream of information, but where said first stream of information and said second stream of information represent at least sounds that are to be played at the same period of time, where said first stream of information has stored information indicative of a first group of sounds that only have first spectral characteristics, and said second stream of information has stored information indicative of a second group of sounds that only have second spectral characteristics, wherein said second spectral characteristics occupy a spectrum that is different than a spectrum of said second spectral characteristics, and wherein said first stream of information and said second stream of information are read as separate information, and represents the same information at said same period of time wherein said first and second group of sounds are each grouped in a way that allows each group's sounds to be more efficiently compressed.

14. A player as in claim 13, wherein said first and second information are each in compressed form, and said first information is read from a first compressed file, and said second information is read from a second compressed file which is a separate file that is separately compressed from said first file.

15. A player as in claim 13, further comprising providing said first stream of information on a first channel directed to a first reproduction unit, and providing said second stream of information on a second channel directed to a second reproduction unit.

16. A player as in claim 13, wherein said first information includes information from a first type of musical source and said second information includes information from a second type of musical source different than the first type of musical source.

17. A player as in claim 13, wherein said first information is information from stringed sources, and said second information is information from wind sources.

* * * * *